AUTOMATIC FREQUENCY CONTROL FOR CARRIER-WAVE RECEIVERS

Filed June 25, 1949 2 Sheets-Sheet 1

INVENTOR.
ALBERT R. ALTER
BY
Brown, Denk & Synnestvedt
AGENTS

Jan. 19, 1954 A. R. ALTER 2,666,847

AUTOMATIC FREQUENCY CONTROL FOR CARRIER-WAVE RECEIVERS

Filed June 25, 1949 2 Sheets-Sheet 2

INVENTOR.
ALBERT R. ALTER

BY

Brown, Denk & Synnestvedt

AGENTS

UNITED STATES PATENT OFFICE 2,666,847

AUTOMATIC FREQUENCY CONTROL FOR CARRIER-WAVE RECEIVERS

Albert R. Alter, Philadelphia, Pa., assignor to Philco Corporation, Philadelphia, Pa., a corporation of Pennsylvania Application June 25, 1949, Serial No. 101,465

3 Claims. (Cl. 250—20)

The present invention relates to automatic frequency control circuits, especially as incorporated in television receivers.

Automatic frequency control (AFC) has been extensively used in conjunction with audio or sound receivers of the superheterodyne type. Such receivers generally include a discriminator which acts to develop a direct-current control potential from the intermediate-frequency (IF) energy when the latter shifts in frequency from an assigned value. In addition to the discriminator unit, a reactance tube may be employed which is associated with the resonant tank circuit of the local oscillator. The control potential from the discriminator is applied to the reactance tube so as to vary the reactance placed across the oscillator tank circuit, such that, with a proper selection of components, the oscillator frequency is maintained at the correct value for each particular setting of the receiver tuning mechanism.

The above-described method of frequency control has been utilized in connected with television receivers of the type employing a separate set of tuning coils for each of the thirteen signal channels. In a preferred design, the antenna coil and the R-F amplifier coil for each channel are built as a single assembly. The mixer coil and the local oscillator coil are also formed as a unit, so that these two assemblies together provide a set of four coils for each one of the television channels. A so-called turret switch, or channel selector, accommodates interchangeably any eight of these sets of coils, and the receiver is accordingly adapted to receive the full number of transmitting stations allotted under present standards to any one particular area.

When the desired antenna coil, R-F coil, local oscillator coil, and mixer coil have been connected to the antenna lead-in by a proper setting of the channel selector knob, the signal from the antenna is transferred to the R-F amplifier circuit. Here the signal is amplified and then impedance-coupled into the mixer circuit, where it heterodynes with the output of the oscillator to produce the predetermined video and audio intermediate frequencies. The output of the local oscillator is inductively coupled to the grid circuit of the mixer, from which tube the signal is fed into the video and audio channels of the receiver. An automatic frequency control circuit, of the nature described above, is incorporated with the local oscillator in such a manner that a control signal from the discriminator in the audio section of the receiver is applied to govern the action of the oscillators, raising or lowering its frequency as necessary to maintain at all times the desired intermediate frequency. This compensates for any frequency drift in the incoming signal, as well as for any small frequency drifts that may arise within the receiver itself.

In a system of the nature described above, the discriminator in the audio section of the receiver must be designed to provide an adequate AFC voltage output over the full bandwidth through which the IF signal may vary as the receiver is tuned to a particular channel. This bandwidth, or range of the audio discriminator necessary for AFC control, is much greater than that normally required to effect a demodulation of the audio signal. For example, in commercial receivers employing the AFC system just described, the required bandwidth of the audio discriminator may be of the order of 500 kc., even through the maximum sound deviation is in the order of ±25 kc. Such a requirement for the audio discriminator reduces its effective sensitivity and may require that the gain of the audio channel be raised by the addition of one or more stages of I-F amplification. This expedient, however, increases the complexity as well as the overall cost of the television receiver.

In accordance with one feature of the present invention, the bandwidth of the audio discriminator is made only as wide as is necessary for proper sound demodulation, this being only slightly in excess of 50 kc. in the example given. An inductance-capacitance network is provided in conjunction with the AFC circuit, and a positive voltage is developed across the capacitance of this LC network during the relatively short period of time that the turret tuning device, or channel selector, is being manually moved from one channel to another. Following this manipulation, and when the desired channel has been tuned in, the capacitance of the LC network is in effect shunted by the inductance, and an oscillatory action occurs which causes the potential across the capacitor to take the form of a damped sinusoidal wave—that is, the voltage on the capacitor drops to zero, rises in a negative direction, and then finally returns to zero. If this varying capacitor potential is applied to the grid of the reactance tube which governs the frequency of the local oscillator, the latter may be made to similarly vary in frequency. During this frequency variation, the IF signal in the audio channel will sweep across the response curve of the discriminator. This results in the development of an AFC control voltage from the discriminator which is of sufficient amplitude to lock in the local oscillator to its proper frequency.

The above cycle of operation will take place each time that the channel selector is shifted from one channel to another. After the above-described lock-in action takes place, the energy in the LC circuit drops to zero, and the effect of this circuit on the normal AFC action is of no further consequence.

One object of the present invention, therefore, is to provide an improved automatic frequency control circuit.

Another object of the invention is to provide, in an automatic frequency control arrangement for television receivers of the type wherein the AFC control voltage is derived from the output of the discriminator in the audio circuit of the receiver, means whereby the bandwidth of such discriminator need only be sufficiently wide to adequately reproduce the audio signal.

A further object of the invention is to provide, in a television receiver of the type described, an AFC pull-in circuit which is energized as a function of the manual operation of the receiver tuning device, thereby to provide an output voltage which is effective to bring the local oscillator signal within the lock-in range of the AFC circuit.

Other objects and advantages will be apparent from the following description of a preferred form of the invention and from the drawings, in which.

To the foregoing general ends it is a feature of the present invention to provide, in an AFC system for television receivers of the type in which the output of a local oscillator is heterodyned with a television signal containing both audio and video information, and in which the receiver includes in the audio section thereof a frequency discriminator the bandwidth of which exceeds only slightly the normal bandwidth of the audio I-F signal (the latter being subject to fluctuations beyond the range of the discriminator during a tuning of the receiver from one channel to another), means for deriving from the discriminator an AFC voltage whenever the audio I-F signal departs from a center I-F frequency but remains within the range of the discriminator, means for developing a control potential as a function of the tuning of the receiver from one channel to another, and a circuit for applying the control potential thus developed to bring the audio I-F signal within the frequency range of the discriminator in the event that it does not then lie within such range.

Figure 1:
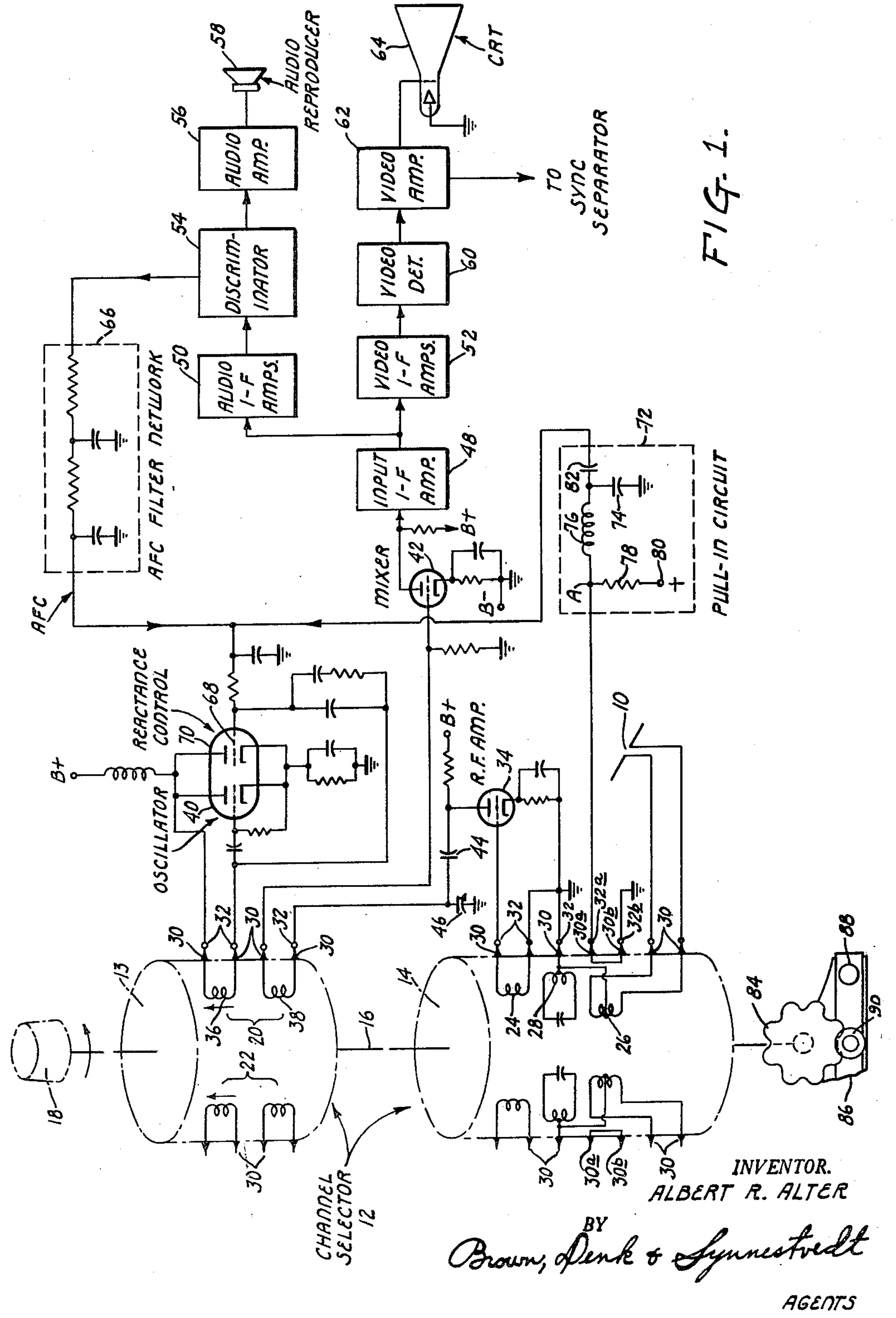
Fig. 1 is a schematic representation of a television receiver employing an automatic frequency control circuit in accordance with the present invention.

Referring first to Fig. 1, there is shown in a more or less schematic fashion a television receiver of the super-heterodyne type incorporating a preferred form of the present invention. Inasmuch as a number of the components of this receiver are of a conventional nature, they have been illustrated by appropriately-labelled blocks in order to simplify the drawing. In general, the receiver includes an antenna 10 from which incoming signals are fed to a channel selector switch 12. The function of the latter is to tune the receiver to the particular television broadcasting station which the operator desires to receive. The channel-selecting portions of this switch 12 form no part of the present invention, and hence it is not believed necessary to set forth these elements in detail. For a full description of the selector mechanism, however, reference is made to a copending United States patent application of L. H. Zepp et al., Serial No. 736,435, filed March 22, 1947, which matured into U. S. Patent 2,545,681 on March 20, 1951. It will only be mentioned herein that the switch 12 includes a pair of rotatable turret members 13 and 14 each of which is secured to a shaft 16 in any suitable manner. These turret members are adapted for rotational movement about the axis of shaft 16 in response to the manual manipulation of a control knob 18.

The turret member 13 carries a plurality of sets of coil windings, two of which sets are identified by the reference numerals 20 and 22. It will of course be understood that additional sets of coils are carried by member 13 (one set for each of eight channels, for example), but the remainder have been omitted from the drawing for the sake of clarity. Each set of coils includes an oscillator winding and a mixer winding, these two windings being so positioned that there is mutual inductive coupling therebetween.

The turret member 14 likewise supports a plurality of sets of coils which are aligned with respect to the inductive elements carried by the turret member 13. Each set of windings associated with the member 14 includes an R-F coil, an input (or antenna) coil, and a link (or coupling) coil. In Fig. 1 these three coils in one representative set carried by the turret member 14 are respectively designated by the reference numerals 24, 26 and 28, respectively.

The turret members 13 and 14 are provided with a plurality of contact buttons to which the various coil terminals are connected. Certain of these contact buttons are indicated in Fig. 1 by the reference numeral 30. It will be appreciated that the various sets of coils may be brought progressively into a predetermined angular position in which the buttons 30 bear against corresponding stationary contacts 32 each of which forms a terminal for a conductor leading to a particular circuit portion of the television receiver. For convenience of illustration, the movable contact buttons 30 carried by the turret members 13 and 14 have been depicted in Fig. 1 by means of arrowheads, and the stationary contact elements 32 by means of circles. It will be further understood that actuation of the control knob 18 to rotate the shaft 16 acts to bring the sets of movable contacts 30 progressively into registry with the stationary contacts 32.

In the above-described manner the antenna 10 is connected to one of the antenna coils 26, the particular coil selected being dependent upon the angular position of the selector switch 12. By means of the link coil 28, the signal energy in the antenna coil 26 is transferred to the grid of an R-F amplifier tube 34 through the R-F coil 24. The three coils 24, 26 and 28 of each set therefore comprise what may be termed an antenna coupling network.

Each set of inductive elements (such as 20) carried by the turret member 13 includes an oscillator coil 36 and a mixer coil 38. The oscillator coil 36 is connected in the grid-plate circuit of an oscillator tube 40, while the mixer coil 38 is connected between the anode of the R-F amplifier tube 34 and the control grid of a mixer tube 42. The oscillator coil 36 is tuned to resonance by both the associated plate-to-cathode capacity and grid-to-cathode capacity of the tube 40, which capacities appear in series across the coil.

The radio-frequency output of the R-F amplifier tube 34 is applied to the control grid of the mixer, or first detector, tube 42 by way of a coupling network which includes the coil 38 and a capacitor 44. This coupling network may be tuned to resonance by means of a trimmer condenser 46. The signal generated by the oscillator tube 40 is injected into the grid circuit of the mixer by way of the mutual inductance between the coils 36 and 38. As a result of this action, there is developed in the output circuit of the mixer tube 42 an intermediate frequency (I-F) signal the frequency of which is equal to the difference between the frequencies of the two input signals. This I-F output of the mixer tube 42 is applied to an input I-F amplifier 48.

The output of the I-F amplifier 48 will consist of two I-F carriers, one of which is modulated with the picture, or video, signals, and the other of which is modulated with the accompanying sound, or audio, signals. The latter are amplified in one or more audio I-F amplifier stages 50, while the former are amplified by one or more video I-F amplifier stages 52. The sound I-F signals are impressed upon a discriminator, or second detector, 54 which acts to develop a detected audio-frequency signal in the usual manner. The latter is then amplified in the audio amplifier 56 and reproduced by some suitable device such as a loudspeaker 58.

The video I-F signals, on the other hand, are applied to the picture second detector 60, which demodulates the video signals. The picture information thus derived is amplified in the video frequency amplifier 62 and employed to modulate the electron scanning beam of a cathode ray tube, or other image-reproducing device, 64. It will be understood that the synchronizing signal information in the composite television signal is separated from the output of the video amplifier 62 by some suitable means, which may be of standard design and which therefore has not been illustrated. It is likewise assumed that a suitable "D.-C. restoring circuit" is utilized in the video channel of the receiver to supply the proper background illumination for the image reproduced by the tube 64.

Since the present invention is not concerned with the foregoing circuits, except insofar as they cooperate with the elements of applicant's invention to be hereinafter described, a further and more detailed description thereof is not believed necessary, although reference is again made to the mentioned Zepp et al. application for a more extended discussion.

In order to maintain, at all times, intermediate frequency carriers of predetermined frequency in both the audio and video channels of the television receiver, an automatic frequency control, or AFC, circuit is utilized. This circuit makes use of a control voltage derived from the discriminator 54 in the sound channel. For example, if the carrier frequency output of the amplifier 50 departs from a predetermined frequency, a control voltage will be obtained from the discriminator 54 the magnitude of which will vary as a function of the degree of departure of the I-F signal from this frequency, and the polarity of which will depend upon the direction of this frequency departure. A discriminator circuit operating in accordance with these principles is set forth in United States Patent No. 2,121,103, issued June 21, 1938, to S. W. Seeley, and hence a detailed description of such apparatus will not be given. It is deemed sufficient to state that a direct-current voltage (AFC bias) is derived from the I-F energy, and that the polarity and magnitude of this bias is dependent on the sense and amount of frequency shift of the I-F carrier from its preassigned frequency. The specific construction of the discriminator 54 forms no part of the present invention, and any type of circuit may be used as long as it is capable of converting a frequency shift in the I-F signal into a representative D.-C. voltage variation.

The output of discriminator 54 is passed through an AFC filter network 66 the function of which is to smooth out variations in the AFC control voltage so that it will be suitable for application as a bias potential to the control electrode 68 of a reactance control tube 70.

The reactance control tube 70, as shown in Fig. 1, is effectively connected in parallel relation with the oscillator tube 40. Hence tube 70 is so related to the oscillator tank circuit, including the coil 36 (plate-to-cathode and grid-to-cathode capacitances of tube 40 being considered as part of this tank circuit), that the tube 70 places an effective inductive reactance across this tank circuit. In other words, tube 70 simulates or reflects a reactance of predetermined sign across the tank circuit of the oscillator tube 40. The magnitude of this reactance is a function of the mutual conductance of tube 70. If the AFC voltage applied to the grid 68 is positive, the mutual conductance of tube 70 is increased. This has the same effect as if the inductance of coil 36 were increased in value thereby causing the frequency of the oscillator 40 to decrease. Conversely, if the AFC voltage is negative, the mutual conductance of tube 70 is decreased, and this effectively decreases the inductance of coil 36 and hence increases the local oscillator frequency. In this manner, a control signal from the discriminator 54 governs the action of the reactance control tube 70 so as to raise or lower the frequency of local oscillator tube 40 as necessary to maintain at all times the preassigned intermediate frequency. This compensates for any frequency drift in the incoming signal received by antenna 10, as well as for any frequency drift that may arise within the receiver itself.

In the circuit as described above, it will be seen that the discriminator 54 must be designed to provide an adequate AFC control voltage output over the full frequency band through which the I-F signal may vary as the television receiver is tuned from one channel to another through manipulation of the channel selector knob 18. If the discriminator bandwidth is not great enough to include these frequency swings, no AFC control voltage output will be produced from the discriminator 54 when the I-F signal is outside the discriminator range.

Accordingly, in commercial receivers embodying the above-described AFC arrangement, the bandwidth of the discriminator 54 is in the neighborhood of 500 kc., and is greatly in excess of the bandwidth required for proper sound demodulation, since the peak-to-peak frequency deviation due to modulation is in the neighborhood of 50 kc. The employment of a discriminator having such a wide bandwidth results in a detected sound output of relatively low level unless an excessively large number of I-F amplifier stages are employed preceding the discriminator 54. As above brought out, the use of additional I-F stages is costly and in addition renders the receiver unnecessarily complex.

In accordance with one feature of the present invention, the bandwidth of the discriminator 54 is made only as wide as is necessary for proper sound demodulation, such, for example, as 100 kc. Normally, this would not result in the development of an adequate AFC control voltage when the receiver is switched from one channel to another, inasmuch as the intermediate frequency may be outside the response curve of the discriminator 54 and, if so, no appreciable control potential will be generated. To meet this possibility, the present invention makes use of a "pull-in" circuit 72. This circuit 72 consists of a capacitor 74, a choke coil 76 having distributed resistance, and a resistor 78, all of which elements are connected in series between ground and the terminal 80 of a source of positive potential.

As will now be described, a varying voltage is developed across capacitor 74, and this voltage is applied through a coupling capacitor 82 to the control electrode 68 of the reactance control tube 70. A point intermediate the resistor 78 and the choke coil 76 (and which point is designated by the reference character A in Fig. 1) is normally connected to ground through a pair of contacts carried by the turret member 14 of the channel selector switch 12. As shown in Fig. 1, this point A on the pull-in circuit 72 is connected to one of the stationary switch contacts 32, this particular contact being designated as **32*a*. The corresponding movable contact 30*a* is connected directly to another movable contact 30*b*, as illustrated. The stationary contact 32*b*, which is associated with the movable contact 30*b*, is grounded. Thus, when the channel selector switch 12 is so positioned that the apparatus of Fig. 1 is adapted to receive signals transmitted over a particular television channel, then the point A in the pull-in circuit 72 is connected to ground. However, when the channel selector switch 12 is being manually actuated by means of the knob 18, and switch 12 is between channels, point A is not grounded since there is then no electrical engagement between the contacts 30*a* and 32*a*, or between the contacts 30*b* and 32*b***.

The channel selector switch 12 is adapted to snap into each selected position. The shaft 16 is indexed in such a manner that each step-by-step movement of the shaft brings different sets of coils into a position in which engagement is made between them and the fixed contacts 32. This indexing means is fully set forth in the copending Zepp et al. application referred to above, and it will only be mentioned that such means may include a cam member 84 having a plurality of detent areas (eight in the present example). This cam member 84 is, of course, fixed to the shaft 16, and cooperates with a lever 86 connected to a plate (not shown) by a pin 88. Lever 86 carries a roller 90 which is urged into contact with the cam member 84 as by means of a spring (not shown) and cooperates with the aforesaid detent areas to insure that the turret members 13 and 14 will be properly indexed in positions such that the desired movable contacts 30 are in registry with the fixed contacts 32.

In describing the operation of the circuit of Fig. 1, let it first be assumed that the elements of the channel selector switch 12 are in the positions shown. As such, point A is grounded, and (a suitable period of time having elapsed since the knob 18 was last manipulated) condenser 74 has no charge appearing thereon. The grounding of point A of course precludes current from flowing into the condenser 74 from the positive potential source connected to the terminal 80.

However, when the channel selector knob 18 is actuated as to tune the television receiver from one channel to another, contacts **30*a*—32*a* and 30*b*—32*b* are momentarily opened. This permits condenser 74 to be charged through the choke coil 76 and the resistor 78, and the magnitude of this charge on condenser 74** will reach the full voltage of the potential source during the time the switch contacts of the tuning device are open.

When the channel selector knob 18 has thus been actuated and the desired television channel switched in, the upper end of resistor 78 (point A in Fig. 1) is again grounded through the contacts **30*a*—30*b* and 32*a*—32*b*. The positive voltage developed on capacitor 74 (during the interval when the channel selector 12 was between channel positions) will now drop to zero, overshoot negative, and eventually return to zero due to the oscillatory nature of the pull-in circuit 72. Since this varying voltage on capacitor 74 is applied through the coupling capacitor 82 to the grid 68 of the reactance control tube 70**, the frequency of the oscillator circuit controlled by the reactance tube will vary in a similar manner.

Figure 2:
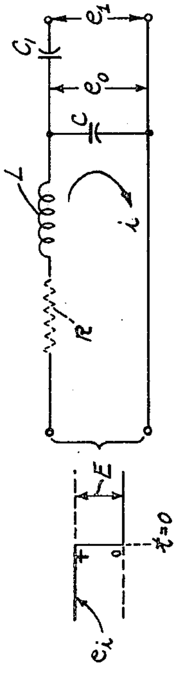
Fig. 2 illustrates separately the pull-in circuit of Fig. 1 in such a manner that its operation may be more readily described.

In order to bring out more clearly the characteristics of the potential applied to the reactance tube circuit, reference is made to Fig. 2 of the drawings, in which the pull-in circuit 72 of Fig. 1 is shown separately. In Fig. 2 the voltage appearing at point A in Fig. 1 is represented as $e_i$ and its amplitude by E. Capacitors 74 and 82 are designated as C and $C_1$, respectively. The choke coil 76 has its inductance indicated by L, while its distributed resistance is set forth in dotted lines and identified by the reference character R.

As shown in Fig. 2, $e_i$ consists of a step of voltage of magnitude E caused by the grounding of point A in Fig. 1 at time $t=0$ when contacts **30*a*—30*b* and 32*a*—32*b*** are initially closed. The output voltage $e_0(t)$ may be expressed as $$e_0(t) = -E(1-\epsilon^{-\alpha t}\cos\omega_0 t)$$

Figure 3:
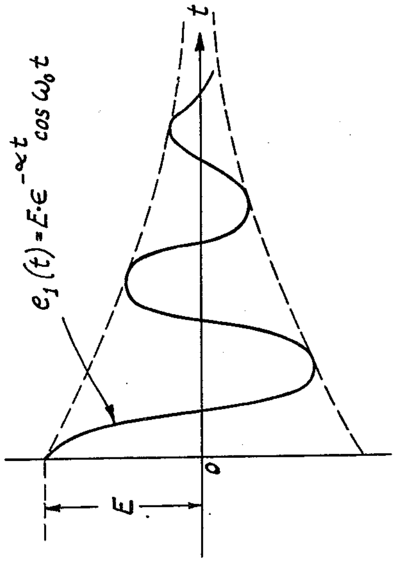

The D.-C. term in this equation is prevented from appearing on the grid 68 of the reactance control tube 70 by the presence of the coupling capacitor $C_1$. Therefore the actual control voltage $e_1$ becomes $$e_1(t) = E\cdot\epsilon^{-\alpha t}\cos\omega_0 t$$

the waveform of which is illustrated in Fig. 3 of the drawings.

It will now be seen that the voltage output of the pull-in circuit 72 will be a damped sinusoidal wave having a maximum amplitude E equal to the charge developed on condenser 74 during the interval of time when the channel selector switch 12 is in a position between channels. This varying voltage output from the pull-in circuit 72, as above brought out, is applied to the control electrode 68 of the reactance control tube 70. The result of this mode of operation is to cause the frequency of the local oscillator tube 40 to vary in a similar manner, and hence the intermediate frequency carrier in the audio channel will also sweep through a range having limits both above and below the assigned intermediate frequency.

Figure 4:
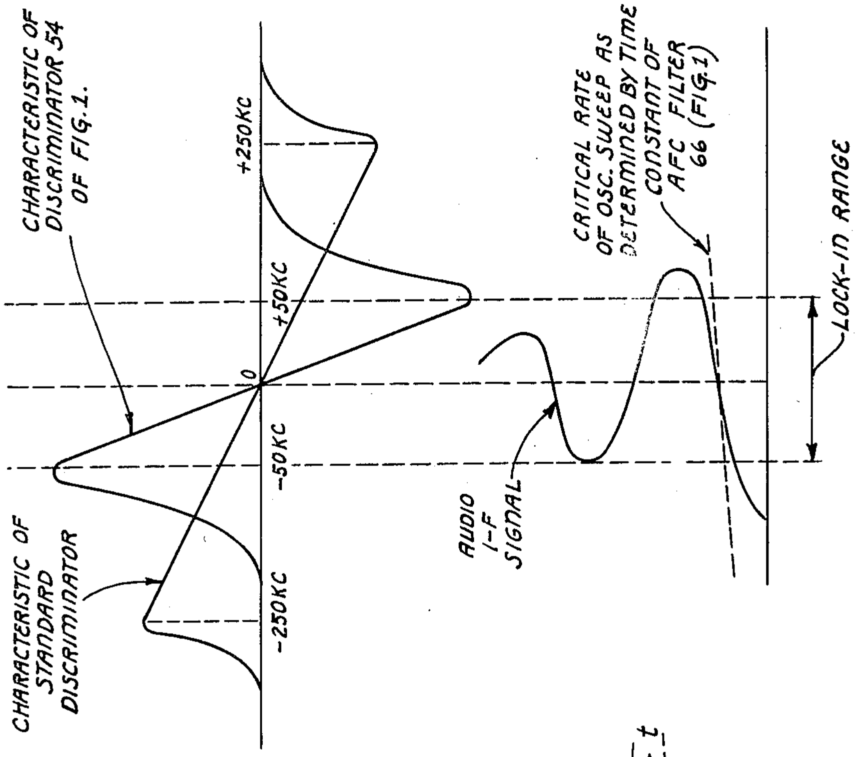
Figs. 3 and 4 are graphical representations useful in describing the operation of the circuit of Fig. 1.

The maximum excursions of this frequency variation may lie beyond the lock-in range of the discriminator-reactance tube circuit during the first few cycles of oscillation of the pull-in circuit 72. However, during each of these initial cycles the signal in the audio channel will sweep through the AFC circuit lock-in range in the manner shown by Fig. 4 of the drawings. Accordingly, an AFC control voltage will be developed in the discriminator 54 during each such sweep period. This control voltage is applied to the control electrode 68 of the reactance control tube 70 so that the latter may be effective to alter the resonant frequency of the oscillator tank circuit. Thus, while wide variations in frequency may occur during the switching action of the channel selector 12, nevertheless the pull-in circuit 72 acts to bring the output of the local oscillator 40 within the lock-in range of the discriminator-reactance tube network in a cyclic manner, and, while the audio I—F signal is within this lock-in range, an effective AFC voltage output is developed in the discriminator 54 to bring about a stabilized circuit operation.

The voltage output of the discriminator 54 in Fig. 1 is relatively higher for a given frequency deviation from center I—F than is the case with the standard, wide-band discriminator employed in conventional circuits. This is apparent from an inspection of Fig. 4, in which the slope of the discriminator curve for Fig. 1 is shown as being considerably greater than the slope of the usual discriminator characteristic.

It will be apparent from the foregoing discussion that the AFC voltage developed by the discriminator 54 of Fig. 1 varies in a cyclic manner in response to operation of the pull-in circuit 72. Accordingly, attention should be given, in the design of the system, to ensure that the filter network 66 is capable of transmitting this alternating component in the output of the discriminator. The frequency at which the AFC control voltage changes must not be in excess of that permitted by the time constant of the AFC filter, since otherwise no effective control bias will be applied to the grid 68 of the reactance control tube. This is brought out by the showing of Fig. 4, where the slope of the dotted line represents the time constant of the AFC filter 66. It will be appreciated that the slope of the audio I-F signal waveform (within the lock-in range of the discriminator) should not be greater than the slope of the dotted line representing the time constant of the filter 66, if an AFC voltage is to be developed. In case the oscillator frequency does vary initially at a higher rate than can be passed by the filter circuit 66, several cycles of oscillation of the pull-in circuit 72 may occur before lock-in is obtained. However, this is of no material consequence, since the additional fraction of a second required for lock-in under such conditions will not be objectionable to the operator of the television receiver.

It will be seen that the lock-in action of the discriminator-reactance tube circuit is otherwise independent of the slope of the I-F signal wave, since, although the local oscillator 40 is swept at an arbitrary rate, it nevertheless must ultimately enter the lock-in region of the AFC detector—reactance tube circuit, and once in that region is placed under the control of that circuit. It is only necessary, as above brought out, that the rate of sweep of the I-F signal be such that the time constant of the AFC filter circuit 66 is not exceeded.

Following the pull-in action of the circuit 72, the voltage on condenser 74 falls to zero, and the pull-in circuit 72 is completely inactive until such time as the channel selector switch 12 is again actuated to another channel position.

The following values have been found suitable for the components of the pull-in circuit 72, although they are of course to be regarded as being merely exemplary:

| | |
|---|---|
| Resistor 78 | 47,000 ohms |
| Choke 76 | 2.5 millihenries |
| Capacitor 74 | .1 microfarad |
| Capacitor 82 | .01 microfarad |
| Potential source 80 | +6 volts |

If desired, point A in the pull-in circuit 72 may be connected to one of the stationary contacts 32 other than *32a*. For example, either of the stationary contacts may be used which lead to the antenna 10, since these are grounded through the link coil 28.

Having thus described my invention, I claim:

1. In an AFC system for television receivers of the type in which the output of a local oscillator is heterodyned with a television signal containing both audio and video information so as to develop video and audio I-F signals, and wherein a manually-actuatable channel selector switch having a plurality of indexed positions is employed to tune the receiver to a desired channel, said receiver further including in the audio section thereof a frequency discriminator, said audio I-F signal being subject to fluctuations in frequency beyond the range of said discriminator during the tuning of said receiver from one channel to another: the combination of means for deriving from said discriminator an AFC voltage whenever the said audio I-F signal departs from a center I-F frequency but lies within the discriminator frequency range; a capacitor; an inductor; a source of potential; a circuit connecting said capacitor, said inductor, and said source of potential in series relation; a set of switch contacts carried by said channel selector switch in normally-closed condition when said selector switch is in an indexed position; a circuit, including said set of switch contacts, shunting said source of potential; means responsive to the manual actuation of said channel selector switch from one of its indexed positions to another to momentarily open said set of contacts and hence remove the shunt from said potential source, whereby said potential source will charge said capacitor through said inductor; means responsive to the subsequent closing of said contacts following the manual actuation of said channel selector switch to again shunt said potential source, whereby an oscillatory voltage is developed in said inductance-capacitance circuit; and means for applying the oscillatory voltage thus developed to control the operation of said local oscillator.

2. In an automatic frequency control system for a carrier-wave receiver of the type in which the output of a local oscillator is heterodyned with a received carrier wave to develop in response thereto an I-F carried signal having a nominal center frequency, and wherein a manually-actuable channel selector device having a plurality of indexed positions is employed to tune the receiver selectively to any one of a plurality of preselected channels, said receiver further including a frequency discriminator responsive to said I-F carrier signal, said I-F carrier signal being subject to fortuitous departures from said nominal center frequency beyond the effective range of said discriminator during the tuning of said receiver from one channel to another, said receiver further including a reactance control tube circuit operatively coupling said frequency discriminator and said local oscillator: the combination comprising a capacitor; an inductor; a source of potential; means connecting said capacitor, said inductor and said source of potential in closed series circuit relation; a set of switch contacts carried by said channel selector device, said contacts being in closed relation when said channel selector device is in an indexed position; a circuit, including said set of switch contacts, shunting said source of potential; means responsive to the manual actuation of said channel selector device from one of its indexed positions momentarily to open said contacts and hence remove the shunt from said source of potential, whereby said capictor is charged through said inductor; means responsive to the subsequent closing of said contacts following the manual actuation of said channel selector device to again shunt said source of potential, whereby a transient oscillatory voltage is developed across the resulting parallel combination of said inductor and said capacitor; and means for applying said transient oscillatory voltage to said reactance tube circuit whereby to effect a transient perturbation in the frequency of said local oscillator sufficient to bring said I-F carrier signal within the said effective range of said discriminator.

3. In an automatic frequency control system for a carrier wave receiver of the type in which the output of a local oscillator is heterodyned with a received carrier wave to develop in response thereto an I-F carrier signal having a nominal assigned frequency, and wherein a manually-actuable channel selector device having a plurality of indexed positions is employed to tune the receiver selectively to any one of a plurality of preselected channels, said receiver further including a frequency discriminator responsive to said I-F carrier signal being subject to fortuitous departures from said nominal assigned frequency beyond the effective range of said discriminator during the tuning of said receiver from one channel to another, said receiver further including a reactance control tube circuit operatively coupling said frequency discriminator and said local oscillator: the combination comprising frequency-modulating means operatively associated with said channel selector device and with said oscillator, said frequency-modulating means including oscillatory means, exclusive of the hereinbefore recited apparatus, for developing a transient oscillation in response to actuation of said channel selector device from one to another of its indexed positions, said frequency modulating means being effective to produce in response to said transient oscillation a transient oscillatory perturbation in the frequency of said local oscillator sufficient to bring said I-F carrier signal within the said effective range of said discriminator.

ALBERT R. ALTER.

References Cited in the file of this patent

UNITED STATES PATENTS

| Number | Name | Date |
|---|---|---|
| 2,084,647 | MacDonald | June 22, 1937 |
| 2,009,156 | Wheeler | Nov. 16, 1937 |
| 2,169,883 | Paffrath | Aug. 15, 1939 |
| 2,189,282 | Foster | Feb. 6, 1940 |
| 2,232,390 | Katzin | Feb. 18, 1941 |
| 2,269,041 | Schussler | Jan. 6, 1942 |
| 2,270,023 | Ramsay | Jan. 13, 1942 |
| 2,341,649 | Peterson | Feb. 15, 1944 |
| 2,354,827 | Peterson | Aug. 1, 1944 |
| 2,410,817 | Ginzton | Nov. 12, 1946 |
| 2,433,350 | Earp | Dec. 30, 1947 |
| 2,425,922 | Crosby | Aug. 19, 1947 |

FOREIGN PATENTS

| Number | Country | Date |
|---|---|---|
| 519,631 | Great Britain | Apr. 2, 1940 |